(12) United States Patent
Koike et al.

(10) Patent No.: US 10,081,326 B2
(45) Date of Patent: Sep. 25, 2018

(54) PASSENGER PROTECTION DEVICE

(71) Applicant: TACHI-S CO., LTD., Akishima-Shi, Tokyo (JP)

(72) Inventors: Atsushi Koike, Ome (JP); Tomohiro Amano, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/512,152

(22) PCT Filed: Mar. 23, 2015

(86) PCT No.: PCT/JP2015/058727
§ 371 (c)(1),
(2) Date: Mar. 17, 2017

(87) PCT Pub. No.: WO2016/042813
PCT Pub. Date: Mar. 24, 2016

(65) Prior Publication Data
US 2017/0291567 A1    Oct. 12, 2017

(30) Foreign Application Priority Data
Sep. 18, 2014 (JP) .................................. 2014-189759

(51) Int. Cl.
*B60R 21/207* (2006.01)
*B60R 21/215* (2011.01)
(Continued)

(52) U.S. Cl.
CPC ............. *B60R 21/207* (2013.01); *B60N 2/79* (2018.02); *B60R 21/215* (2013.01); *B60R 21/23138* (2013.01); *B60R 2021/23146* (2013.01)

(58) Field of Classification Search
CPC ................ B60R 21/207; B60R 21/215; B60R 21/23138; B60R 2021/23146; B60N 2/79
See application file for complete search history.

(56) References Cited

U.S. PATENT DOCUMENTS 3,981,520 A * 9/1976 Pulling ................ B60N 2/4221
                                                                    180/274
5,316,336 A * 5/1994 Taguchi .................. B60R 21/21
                                                                    280/728.1
(Continued)

FOREIGN PATENT DOCUMENTS

JP          04356246 A    12/1992
JP          05003055 U     1/1993
(Continued)

OTHER PUBLICATIONS

International Search Report corresponding to Application No. PCT/JP2015/058727; dated May 19, 2015, with English translation.

*Primary Examiner* — Drew J Brown
(74) *Attorney, Agent, or Firm* — Cantor Colburn LLP

(57) ABSTRACT

A passenger protection device includes an airbag case to be provided in an arm rest of a vehicle seat, and an airbag; wherein the airbag case has a passenger-side wall that is a cover that can rotate upward around its upper end; the device comprises support members that lie flat on a passenger-side surface of the cover and can assume an upright orientation; and if the vehicle collides at one side, the airbag is inflated and deployed outside the airbag case through the opening made in a passenger-side of the arm rest and pushes the cover, thereby rotating the cover upward, the support members may stand on the airbag case, supporting the cover rotated upward from back in an upright orientation.

20 Claims, 9 Drawing Sheets

(51) Int. Cl.
    *B60R 21/231*     (2011.01)
    *B60N 2/75*     (2018.01)

(56) References Cited

U.S. PATENT DOCUMENTS

| | | | |
|---|---|---|---|
| 5,746,443 A * | 5/1998 | Townsend | B60J 5/06 |
| | | | 280/730.2 |
| 2008/0129020 A1 | 6/2008 | Bostrom et al. | |
| 2013/0127140 A1 * | 5/2013 | Obadia | B60R 21/18 |
| | | | 280/733 |
| 2014/0097601 A1 * | 4/2014 | Fukawatase | B60R 21/231 |
| | | | 280/730.2 |
| 2017/0072893 A1 * | 3/2017 | Fujiwara | B60R 21/23138 |
| 2017/0072900 A1 * | 3/2017 | Fujiwara | B60R 21/23138 |
| 2018/0086299 A1 * | 3/2018 | Kalinowski | B60R 21/207 |

FOREIGN PATENT DOCUMENTS

| | | |
|---|---|---|
| JP | 2008542100 A | 11/2008 |
| JP | 2009149122 A | 7/2009 |
| JP | 2014076703 A | 5/2014 |

* cited by examiner

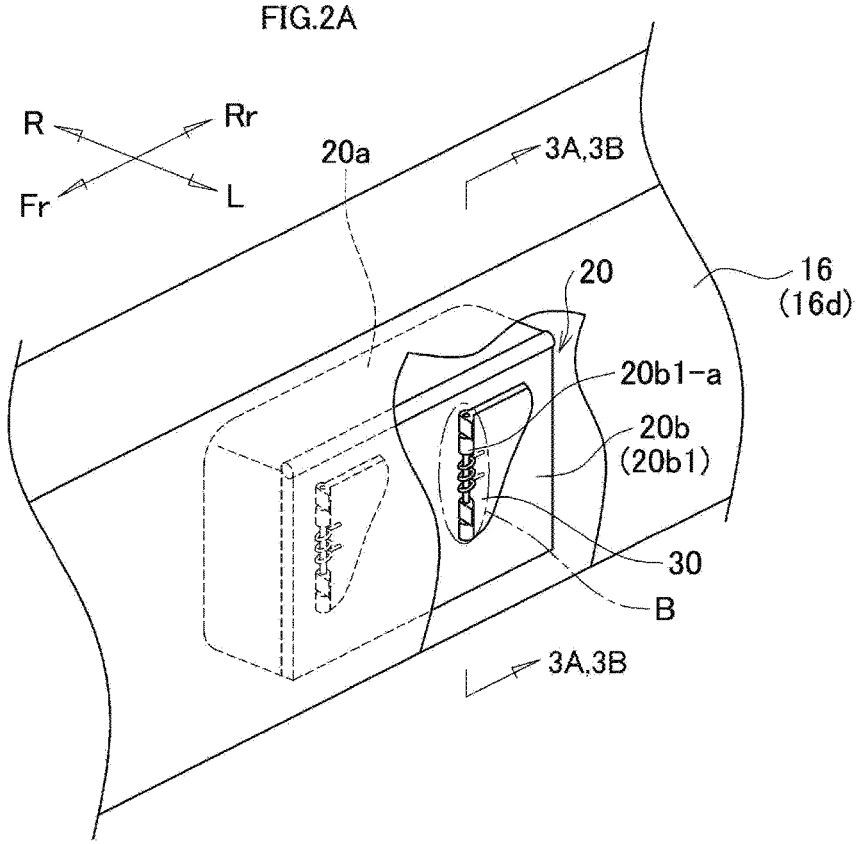
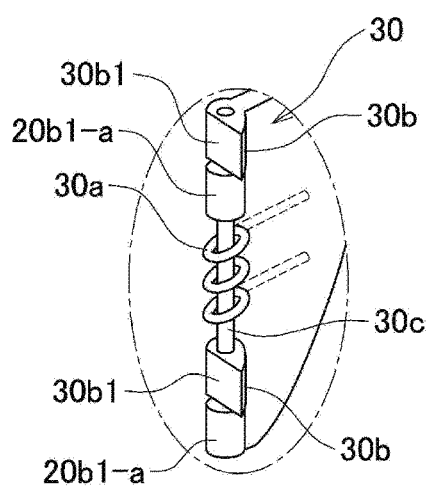
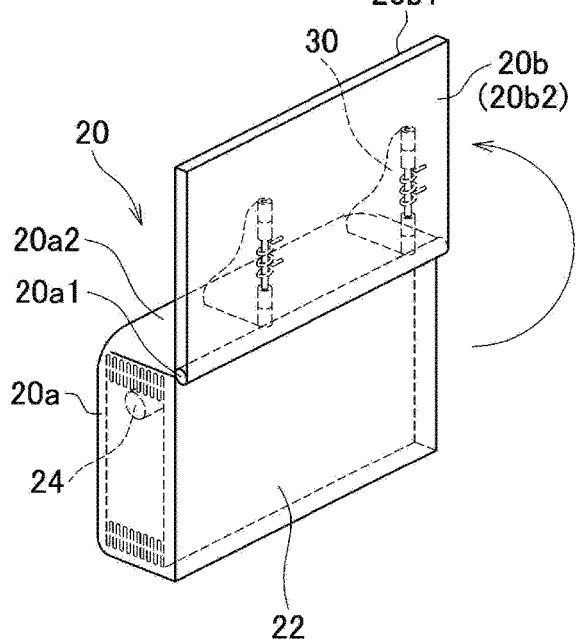

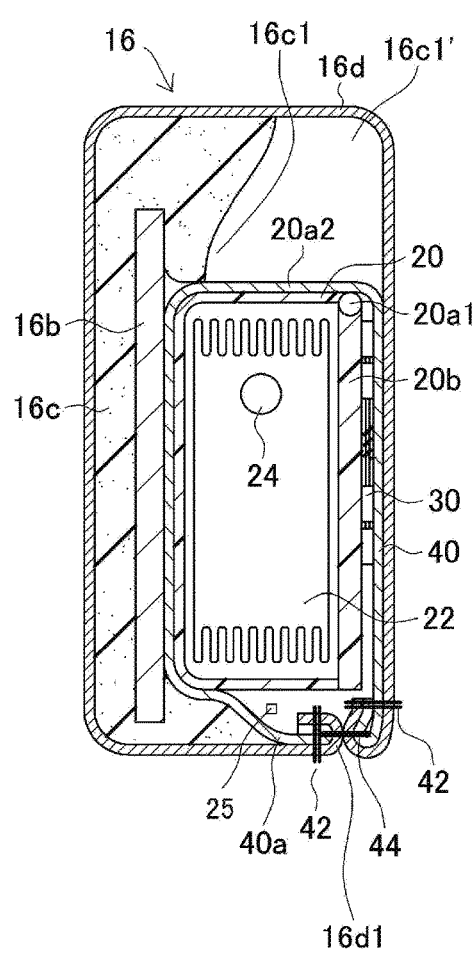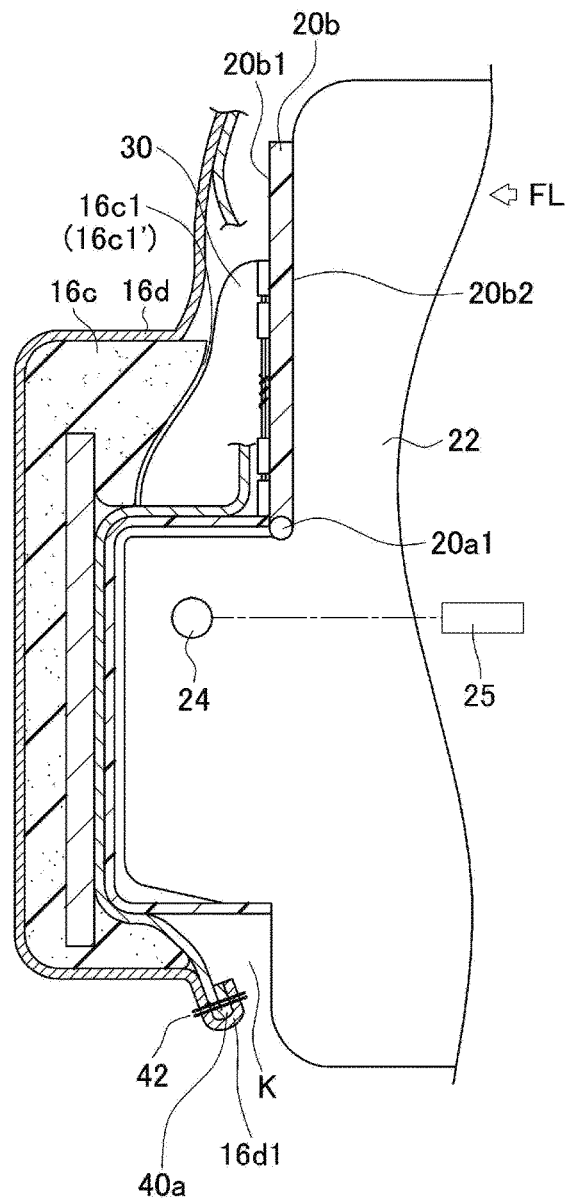

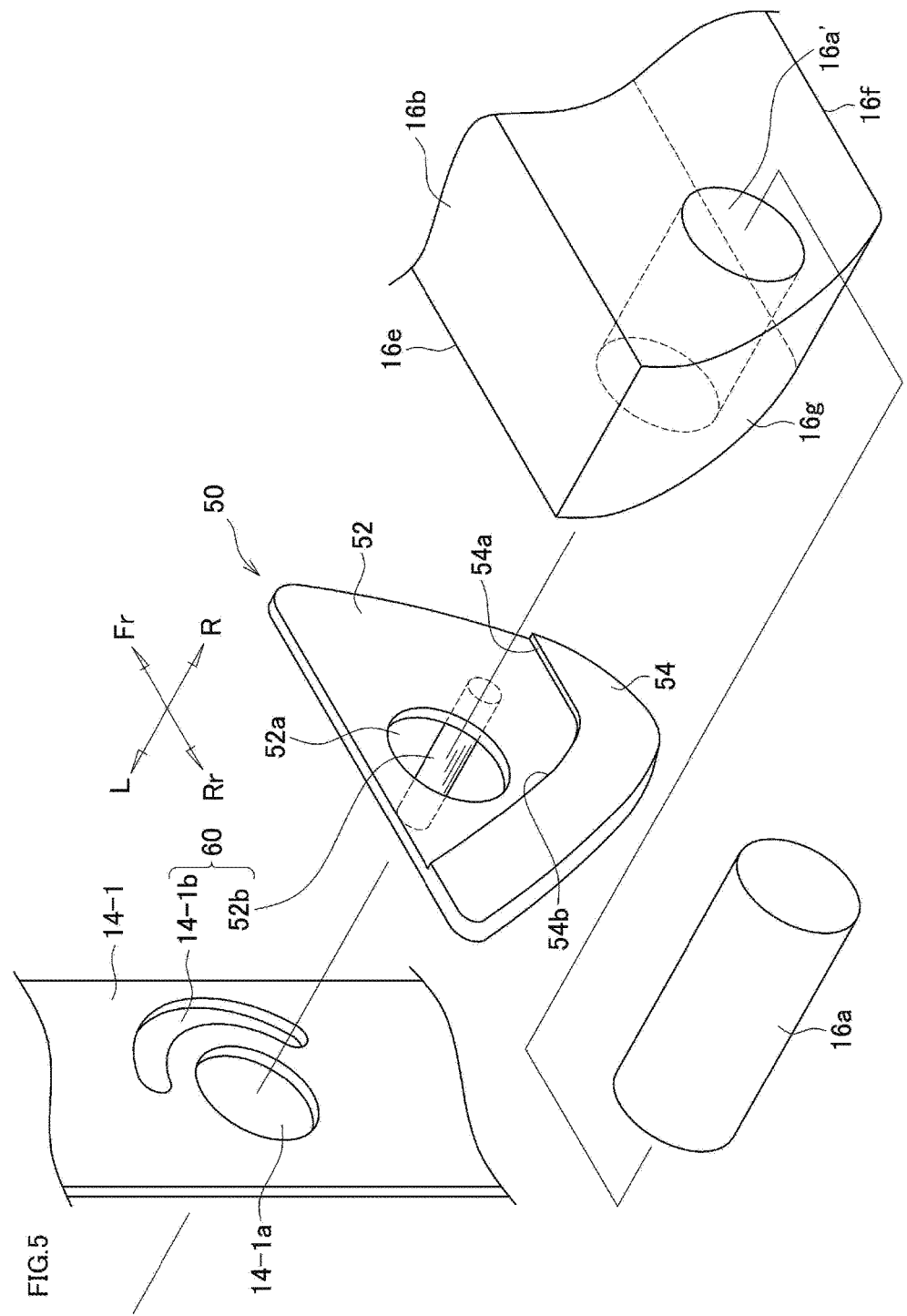

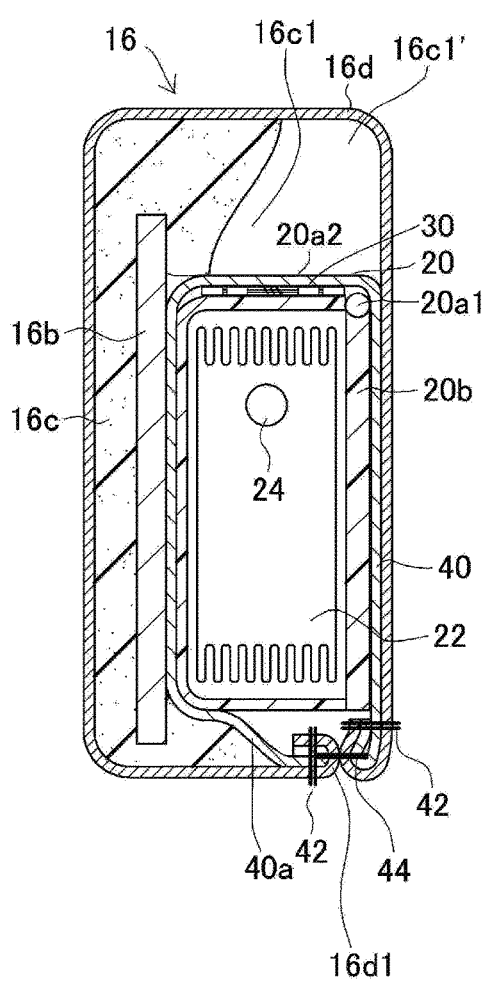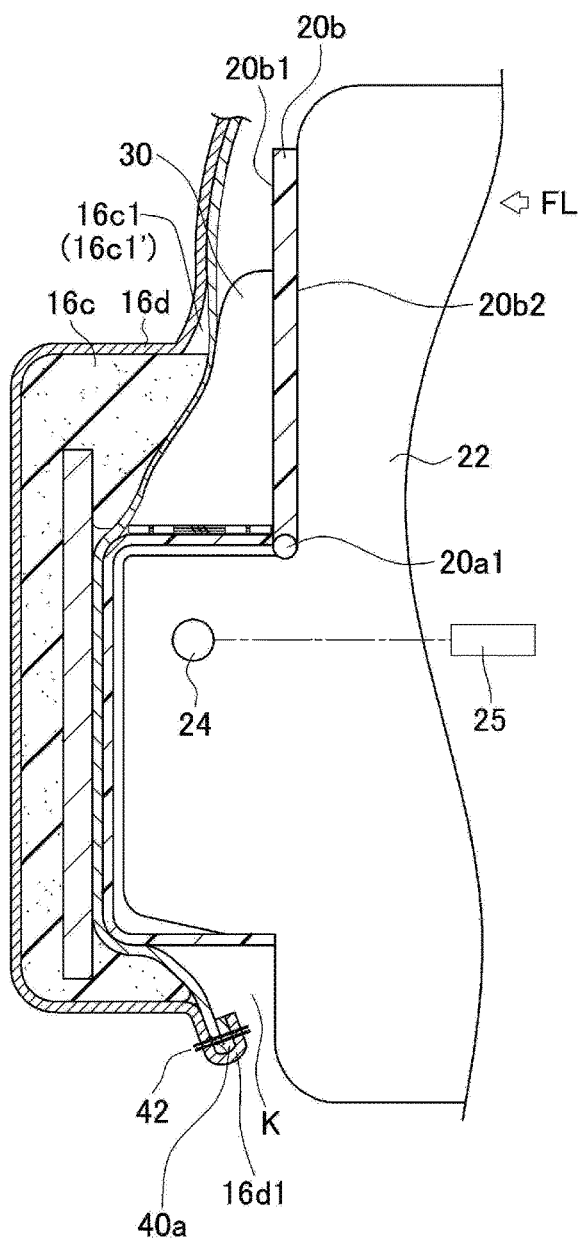

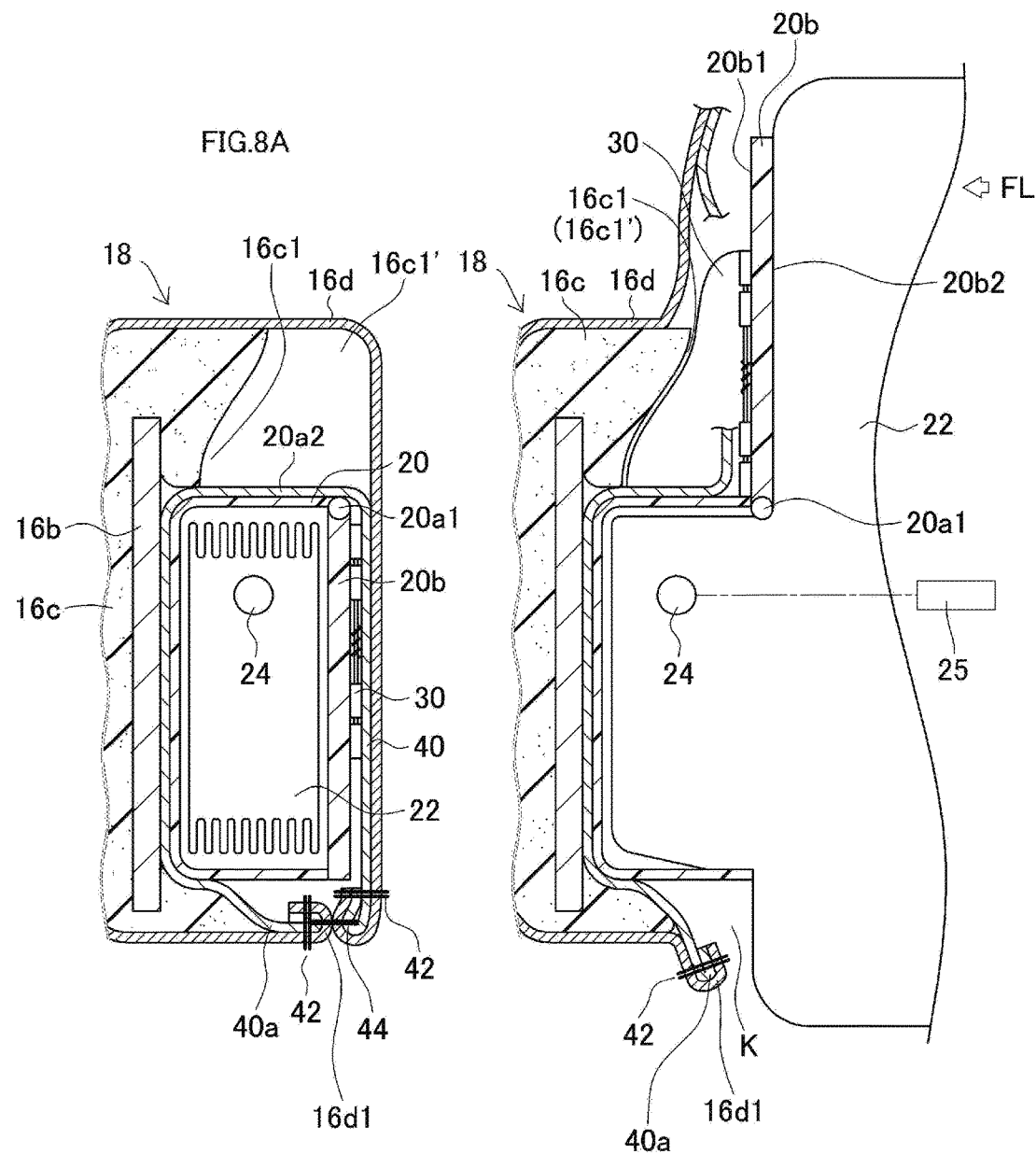

PASSENGER PROTECTION DEVICE

CROSS REFERENCE TO RELATED APPLICATIONS

This is the U.S. national stage of application No. PCT/JP2015/058727 dated Mar. 23, 2015. Priority under 35 U.S.C. § 119(a) and 35 U.S.C. § 365(b) is claimed from Japanese Patent Application No. 2014-189759, filed Sep. 18, 2014; the entire contents of which are incorporated herein by reference.

DESCRIPTION

Background of the Invention

1. Field of the Invention

This invention relates to (seated) passenger protection device to be provided in the console box or arm rest of a seat and to act in case of a collision at one side, thereby to protect the passenger seated on the seat.

2. Description of the Related Art

If a vehicle collides with, for example, another vehicle at one side (for example, right side), the passenger seated on the collision-side seat (i.e., right-side seat) juxtaposed with the other seat (i.e., left-seat seat) is moved, by the collision impact, from the seated position toward the opposite side (i.e., left side, or far side). On the other hand, an inertial force acts on the passenger seated on the opposite side (i.e., left side) to keep him or her at the seated position.

Consequently, the passengers seated side by side in the left-right direction of the vehicle may be moved away from the vehicle walls, namely toward the inside of the vehicle, and may contact each other.

A (seated) passenger protection device is widely known, which is designed to protect the passengers in case of a collision at one side. Known as such a device is, for example, the airbag. The airbag contains an inflator and is folded in an airbag case shaped like a rectangular box. When an impact sensor detects a collision impact, the inflator generates high-pressure gas, inflating the airbag. So inflated, the airbag pushes up the cover of the airbag case, and is eventually deployed outside the airbag case, between the passengers seated side by side in the left-right direction, preventing the passengers from contacting each other.

If only one passenger is seated in the left or right seat, he moves toward inside at the time of collision and his upper body tends to incline inward. However, his upper body is prevented from inclining, because the airbag is inflated and deployed at the passenger's side and supports the passenger.

Japanese Utility Model unexamined Publication JP05-003055Y discloses a passenger protection device comprising a console box with an airbag case. The console box has a cover and is arranged between the left-side seat and the right-side seat. The airbag case is provided in the console box. The cover of the console box functions as the cover of the airbag case, too. The cover can rotate upward around one end of the console box, for example the end remote from the passenger (i.e., driver) seated on the driver's seat. The other end of the cover, which is adjacent to the driver, is engaged in normal condition.

If the vehicle collides at one side, the airbag is inflated with the high-pressure gas flowing from the inflator, and pushes up the cover of the console box. The other end of the cover is thereby disengaged, and the cover of the console box rotates around its one end, opening the upper surface of the console box. As a result, the airbag bulges from the console box and is deployed, preventing the two passengers seated at the left and right sides of the console box from contacting each other.

Japanese Patent unexamined Publication JP2009-149122A discloses a passenger protection device, too. Like the device of Japanese Utility Model unexamined Publication JP05-003055Y, this device comprises a console box arranged between left and right vehicle seats. An airbag case is provided in the console box. If the vehicle having the device collides at one side, the airbag contained in the airbag case is inflated, pushing and rotating the cover upward at the upper surface of the console box. The console box is thereby opened at the upper surface, and the airbag is deployed from the opening.

In the device of Japanese Patent unexamined Publication JP2009-149122A, the cover of the console box can rotate around the left or right end, in accordance with the direction the impact is applied to the console box when the vehicle collides at one side.

In the devices disclosed in Japanese Utility Model unexamined Publication JP05-003055Y and Japanese Patent unexamined Publication JP2009-149122A, the airbag is contained in the console box.

Japanese Patent unexamined Publication JP2008-542100A discloses a device that can inflate an airbag contained not in a console box, but in an arm rest which can be rotated forward at one side of the seatback, thereby to deploy the airbag onto the upper surface of the arm rest. If inflated, the airbag pushes up the cover at the upper surface of the arm rest, opening the arm rest, and is thereby deployed outside the arm rest through the opening.

Patent Literature 1: Japanese Utility Model unexamined Publication JP05-003055Y

Patent Literature 2: Japanese Patent unexamined Publication JP2009-149122A

Patent Literature 3: Japanese Patent unexamined Publication JP2008-542100A

In the conventional devices specified above, the cover provided on the upper surface of the console box or on the upper surface of the arm rest is pushed up by the inflated airbag, is thereby rotated, opening the console box or the arm rest, whereby the airbag is deployed outside the console box or the arm rest.

The airbag, for example, may be inflated upward from the upper surface of the console box and then deployed between the seats, to receive the inertial force applied to the passengers if the vehicle collides at one side. However, the airbag can hardly receive the inertial force applied to the passengers if the airbag is not supported from back and the reaction force is not applied to the airbag to prevent the airbag from collapsing.

As the airbag is inflated, the cover on the upper surface of the console box rotates upward. If the rotation of the cover is controlled, supporting the cover in a prescribed orientation such as a substantially upright orientation (i.e., standing position), the cover will support the airbag from back to apply the reaction force to the airbag. Therefore, the cover can function as reaction means.

In the device disclosed in Japanese Utility Model unexamined Publication JP05-003055Y, the cover of the console box is secured at only the left or right end, and can therefore rotate around this end (functioning as rotation axis). Further, the device is not so configured to control the rotation of the cover on the upper surface of the console box. Inevitably, the cover cannot support the airbag from back to prevent the airbag from collapsing, and fails to function as reaction means. Hence, the airbag cannot fully perform its protective function. That is, the airbag may fail to protect the passenger well on the far side at the time of collision.

In the device disclosed in Japanese patent unexamined Publication JP2009-149122A, the cover of the console box can rotate around the left or right end (functioning as rotation axis) in accordance with the direction the impact is applied to the console box when the vehicle collides at one side. Further, the console box has, on its upper surface, a portion that abuts on a side surface (e.g., left or right side surface) of the cover when the cover is pushed up and rotated. The cover so pushed up abuts, at the side, on the portion (abutting portion) of the console box. The rotation of the cover is therefore controlled, and the cover is supported in a substantially upright orientation.

Once rotated upward when the vehicle collides at one side, the cover functions as reaction means, and supports the airbag from back no matter whether the vehicle has collided at the left or the right side. Thus, the device can well protect the passenger on the far side.

So pushed up and rotated, the cover abuts, at the side, on the abutting portion of the console box, and controls the rotation of the cover. Since the cover supports the airbag from back, the inertial force applied to the passenger acts on the cover through the airbag. The cover therefore receives a bending moment resulting from the inertial force, and the side of the cover is pushed onto the abutting portion at the upper surface of the console box.

The abutting portion provided on the upper surface of the console box is adjacent to that end of the cover, around which the cover can rotate. Therefore, a large bending moment is applied to the cover. The cover is not so thick, and has a small sectional area. In spite of this, the cover must resist the large moment and support the airbag from back with a reaction force large enough to enable the passenger protection device (more precisely, airbag) to perform its function fully. To this end, the cover must be thick or made of material having high rigidity. If the cover is thick or made of rigid material, however, the passenger protection device will become larger and more expensive.

An object of this invention is to provide a passenger protection device that can perform a protective function fully, without thickening the cover or using highly rigid material for the cover.

SUMMARY OF THE INVENTION

In order to achieve the above-mentioned object, a passenger protection device according to this invention comprises a cover and support members for supporting the cover rotated up, in a substantially upright orientation.

According to one aspect of the embodiment of claim 1, an passenger protection device includes an airbag case to be provided in an arm rest of a vehicle seat, and an airbag with an inflator, folded and stored in the airbag case and configured to be inflated if the vehicle having the device collides at one side and then be deployed outside the airbag case through an opening made in the arm rest, thereby to protect the passenger seated on the vehicle seat; wherein the airbag case is shaped like a box and has a passenger-side wall that is a cover that can rotate upward around its upper end; the device comprises support members that lie flat on a passenger-side surface of the cover and can assume an upright orientation; and if the vehicle collides at one side, the airbag is inflated and deployed outside the airbag case through the opening made in a passenger-side of the arm rest and pushes the cover, thereby rotating the cover upward, the support members stand on the airbag case, supporting the cover rotated upward from back in an upright orientation.

In the one aspect of the embodiment of claim 1, the support members stand up from a lying position and support the cover, from back, in an upright orientation. So supported by the support members, the cover keeps standing in the upright orientation, against the bending moment acting on it when the vehicle collides at one side. The cover therefore functions as reaction means. Hence, the passenger protection device can perform its protective function fully, without thickening the cover or using high rigidity material for the cover.

BRIEF DESCRIPTION OF THE DRAWINGS

FIG. 2A is a partly sectional, schematic perspective view of an arm rest having a passenger protection device;

FIG. 2B is a magnified view of part B of FIG. 2A;

FIG. 2C is a perspective view of an airbag case, with a cover rotated at one side of the passenger protection device;

FIG. 3A is a sectional view of the arm rest in normal condition, taken along line 3A, 3B-3A, 3B shown in FIG. 2A;

FIG. 3B is a partly sectional view of the arm rest at the time of a collision, taken along line 3A, 3B-3A, 3B shown in FIG. 2A;

FIG. 4A-2 is a side view of the vehicle seat with the arm rest rotated to the stored position;

FIG. 4B-1 is a partly sectional, magnified front view of a part of the seatback with the arm rest rotated forward;

FIG. 4B-2 is a partly sectional, magnified front view of a part of the seatback, with the arm rest rotated to the stored position;

FIG. 5 is a partly sectional, perspective view showing the seatback frame, support member and arm rest as seen from back;

FIG. 6D-A is a sectional view of the arm rest in normal condition, as FIG. 3A;

FIG. 6D-B is a partly sectional view of the arm rest at the time of a collision, as FIG. 3B;

FIG. 8A is a sectional view of the console box in normal condition, as FIG. 3A and FIG. 8B is a partly sectional view of the console box at the time of a collision, as FIG. 3B.

DETAILED DESCRIPTION OF THE INVENTION

An passenger protection device comprises an airbag case to be provided in an arm rest of a vehicle seat, and an airbag with an inflator, folded and stored in the airbag case and configured to be inflated if the vehicle having the device collides at one side and then be deployed outside the airbag case through an opening made in the arm rest, thereby to protect the passenger seated on the vehicle seat; wherein the airbag case is shaped like a box and has a passenger-side wall that is a cover that can rotate upward around its upper end; the device comprises support members that lie flat on a passenger-side surface of the cover and can assume an upright orientation; and if the vehicle collides at one side, the airbag is inflated and deployed outside the airbag case through the opening made in a passenger-side of the arm rest and pushes the cover, thereby rotating the cover upward, the support members stand on the airbag case, supporting the cover rotated upward from back in an upright orientation.

Embodiments

Figure 1A:
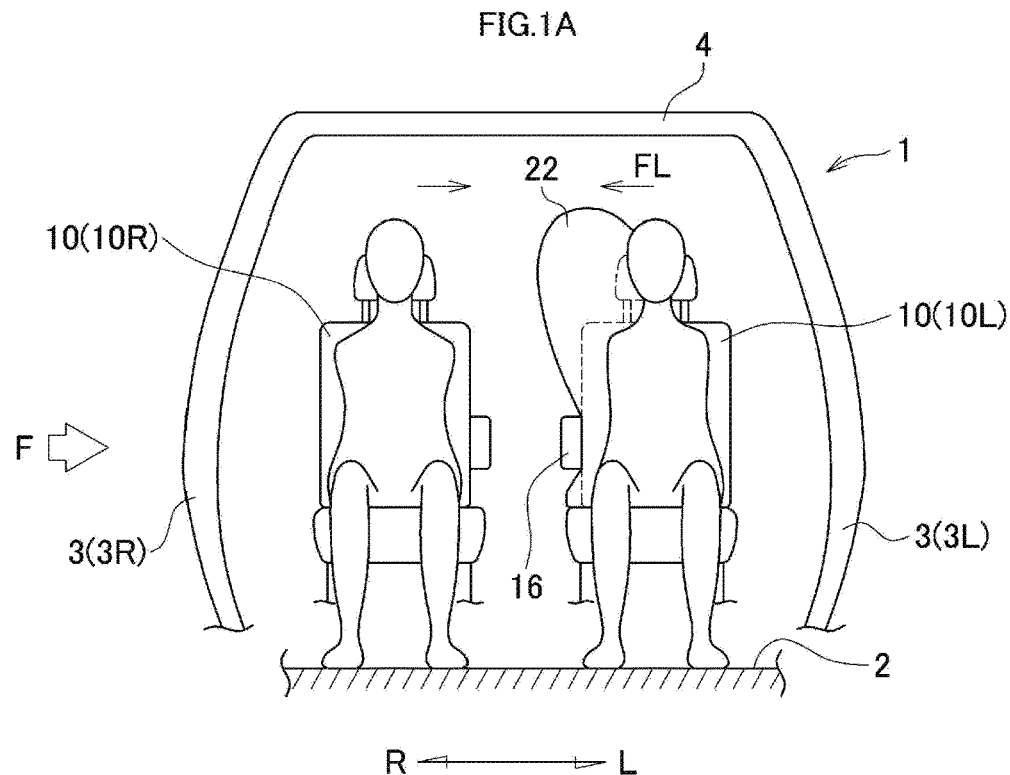
FIG. 1A is a schematic sectional view of a vehicle in which each arm rest contains a passenger protection device according to an embodiment (Embodiment 1) of this invention.
Figure 1B:
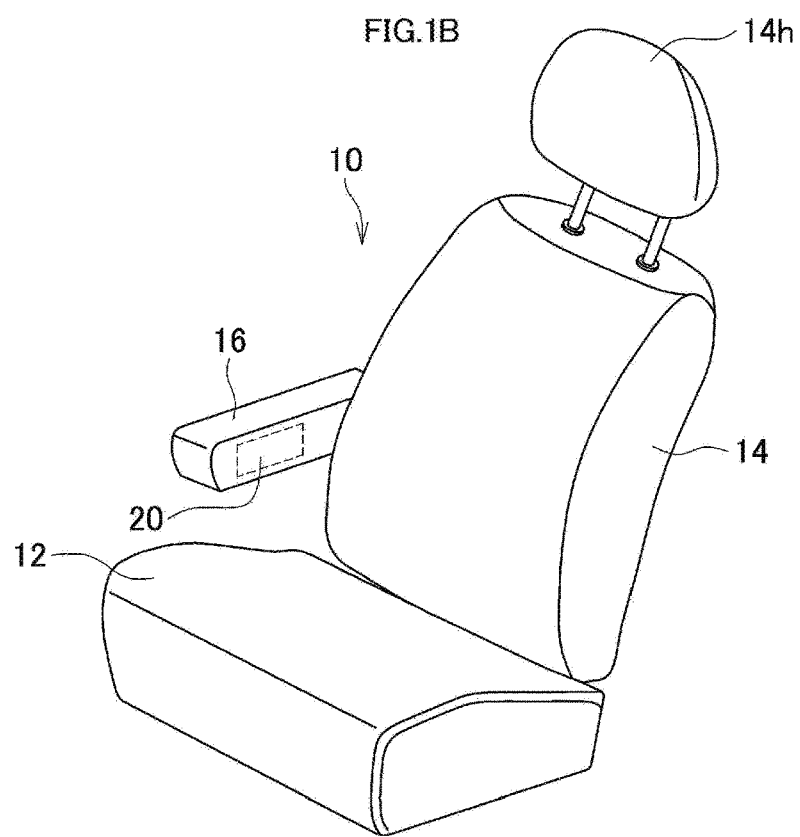
FIG. 1B is a schematic perspective view of a vehicle seat on the far side opposing to the side, at which the vehicle collides at one side.

Embodiments of this invention will be described with reference to the accompanying drawings. FIG. 1A is a schematic sectional view of a vehicle in which each arm rest contains a passenger protection device according to an embodiment (Embodiment 1) of this invention; FIG. 1B is a schematic perspective view of a vehicle seat on the far side opposing to the side, at which the vehicle collides at one side; FIG. 2A is a partly sectional, schematic perspective view of an arm rest having a passenger protection device; FIG. 2B is a magnified view of part B of FIG. 2A; FIG. 2C is a perspective view of an airbag case, with a cover rotated at one side of the passenger protection device; FIG. 3A is a sectional view of the arm rest in normal condition, taken along line 3A,3B-3A,3B shown in FIG. 2A and FIG. 3B is a partly sectional view of the arm rest at the time of a collision, taken along line 3A,3B-3A,3B shown in FIG. 2A.

In the drawings, arrows Fr and Rr indicate the forward and rearward directions, with respect to the driver seated in the driver seat.

As shown in FIG. 1A, two vehicle seats 10 (seats 10L and 10R) are arranged on the floor 2 of a vehicle 1, side by side in the widthwise direction (left-right direction) of the vehicle.

Two side frames 3 (side frames 3R and 3L) are provided in the vehicle, respectively at the left and right sides of the vehicle. The side frames function as left and right sidewalls of the vehicle and support the ceiling portion 4 defining the top of the vehicle.

As shown in FIG. 1B, each vehicle seat 10 comprises a seat cushion 12 and a seatback 14 provided at the rear edge of the seat cushion. On one side of the seatback, an arm rest 16 is provided and can be rotated around an axle 16a (i.e., rotation axle of the arm rest, see FIG. 4(A)). On the top of the seatback, a headrest 14h is provided and can be moved up and down.

The seat cushion 12, seatback 14 and arm rest 16 have structures well known in the art. The arm rest, for example, includes an arm rest frame 16b (see FIG. 3A), a pad 16c, and an air-permeable trim cover 16d. The pad 16c is made of foam such as urethane foam and mounted on the arm rest frame. The air-permeable trim cover (skin member) 16d covers the pad 16c. Like the arm rest, the seat cushion 12 and the seatback 14 are made by covering a pad (not shown) mounted on the seat cushion frame or seatback frame 141 (see FIG. 4B-1) with a trim cover (not shown).

The arm rest 16 is arranged on the inner side of the vehicle seat 10, rendering it easier for the passenger to get into and from the vehicle.

Two passenger protection devices according to this invention are provided in the right-side seat 10R and the left-side seat 10L, respectively. Only the left-side seat (far-side seat) 10L will be described, on the assumption that the vehicle collides at the right side and therefore receives an impact F indicated by an arrow in FIG. 1A. The passenger protection devices provided in the right-side seat 10R and the left-side seat 10L are identical in structure, though they are symmetrical with respect to the left-right direction of the vehicle. As seen from FIG. 1B and FIG. 2A, each device comprises an airbag case 20, which is provided in the front part of the arm rest 16. The arm rest can be rotated forward. The airbag case 20 is shaped like a box. The sidewall of the airbag case 20, on the side of the passenger, is a cover that can be rotated upward around its upper end. More specifically, the airbag case 20 includes a main body 20a and a cover 20b. The main body 20a is shaped like a box opening at the passenger side. The cover 20b is provided on the open side (the passenger side) of the main body and can rotate upward around its upper end (more precisely, a rotation axle 20a1 provided at the upper end of the main body 20a).

The airbag case 20 contains, in its main body 20a, an airbag 22 and an inflator 24. The airbag 22 is folded and contained in the main body 20a. The inflator 24 is configured to generate high-pressure gas to inflate the airbag 22.

On that surface 20b1 of the cover 20b, which may face the passenger, support members 30 are arranged in a lying position and can rotate. In FIG. 2A, two support members 30 are illustrated. Instead, one support member may be arranged, or three or more support members may be arranged side by side, on the passenger-side surface 20b1 of the cover. If two or more support members are arranged side by side, they can support the cover 20b evenly at the left and right parts thereof, to prevent the cover from inclining to the left or right.

The support members 30 are ribs provided on the passenger-side 20b1 of the cover, each having a bias member 30a. The ribs (support members) 30 are rotated by the bias members, assuming an upright orientation, if the cover 20b is rotated upward. As shown in FIG. 2A, the ribs 30 are shaped like an inverted right triangle and arranged on the passenger-side surface 20b1 of the cover.

More specifically, the ribs (support members) 30 are held to the passenger-side surface 20b1 of the cover, each by a first support strip 30b provided on the rib and by a support axle 30c. The support axle is supported by a second support strip 20b1-a provided on the passenger-side surface 20b1 of the cover. The first support strip 30b is shaped like a hollow cylinder extending in the up-down direction and is secured to one side of the rib shaped like an inverted right triangle. On the passenger-side surface 20b1 of the cover, two second support strips 20b1-a are provided below the upper and lower first support strips 30b provided on the rib. The support axle 30c passes through the first support strips 30b and the second support strips 20b1-a.

The ribs 30 are arranged on the passenger-side surface 20b1 of the cover, each having its upper side intersecting at right angles with that side of the right triangle, which extends in the up-down direction.

The bias member 30*a* of each rib is, for example, a torsion spring wound around the support axle 30*c* and located between the first support strips 30*b* of the rib and the second support strips 20*b*1-*a* of the cover. The bias member 30*a* applies a bias to the passenger-side surface 20*b*1 of the cover to set the rib 30 to the upright orientation.

As seen from FIG. 2B, the first support strip 30*b* of each rib has a control portion 30*b*1. The control portion 30*b*1 has, for example, a flat surface substantially perpendicular to the passenger-side surface 20*b*1 of the cover while the rib 30 keeps lying flat on the passenger-side surface 20*b*1 of the cover.

As shown in FIG. 3A, the airbag case 20 having the ribs (support means) 30 is covered with webbing 40 all around while the vehicle seat remains in normal state. The pad 16*c* of the arm rest has a recess 16*c*1 opening at the passenger side and having a size large enough to hold the airbag case 20. The airbag case 20 covered with the webbing 40 is held in the recess 16*c*1.

That part of the pad 16*c*, which exists above the airbag case 20, is cut and, providing a space 16*c*1'. The space 16*c*1' has a shape corresponding to that of the ribs 30. The skin member (i.e., trim cover) 16*d* of the arm rest covers not only the pad 16*c*, but also the space 16*c*1' and the webbing 40 covering the airbag case 20.

The webbing 40 and the skin member (i.e., trim cover) 16*d* of the arm rest push the ribs 30 provided on the cover 20*b*. The ribs 30 are restricted and held to lie flat on the passenger-side surface 20*b*1 of the cover, respectively, in spite of the bias they receive from the bias members 30*a*.

The ends 40*a* of the webbing overlap the ends 16*d*1 of the skin member of the arm rest. Then, the ends 40*a* of the webbing and the ends 16*d*1 of the skin member of the arm rest, overlapping, are bent inwards to make bent parts, and sewed together, forming sewed portions 42. Further, the bent parts are sewed together at a lower-inner corner of the arm rest 16, forming sewed portion 44. The sewed portion 44 is a rupture portion. The sewed portion (rupture portion) 44 will be ripped open if the vehicle collides at one side, to allow the airbag 22 to be inflated and deployed.

The webbing 40 need not be used. If the webbing 40 is not used, the ribs 30 will be pushed by the skin member 16*d* of the arm rest and will lie flat on the passenger-side surface 20*b*1 of the cover.

As seen from FIG. 3A, the ribs 30 are covered with, and pushed by, the webbing 40 and the skin member 16*d* of the arm rest, but are not covered with the pad 16*c*. Instead, the pad 16*c* may be made thinner and inserted into the gap between the webbing 40 and the skin member 16*d*, thereby to push the ribs 30 via the thin pad onto the skin member of the arm rest, which covers the airbag case 20. It suffices that the ribs 30 are pushed, through or not through the pad 16*c*, onto the skin member 16*d* of the arm rest, which covers the airbag case, and restricted to lie flat on the passenger-side surface 20*b*1 of the cover.

It will be explained how the passenger protection device operates if an impact is applied to the side frame 3 of the vehicle 1. Assume that the vehicle collides at right side, receiving an impact F indicated by an arrow in FIG. 1A at the seat 10L arranged at the far side (left side). The arm rest 16 of the left-side seat 10L is in the substantially horizontal position, where it is rotated forward as shown in FIGS. 1A and 1B.

When the impact sensor 25 detects the impact applied to the right side of the vehicle, a drive current is output from a control circuit of the impact sensor to the inflator 24 provided in the arm rest 16 of the far-side (left-side) seat. The ignition device (not shown) of the inflator is thereby operated. The inflator 24, which is provided in the arm rest 16 of the far-side seat, therefore generates high-pressure gas, inflating the airbag 22. So inflated, the airbag pushes the cover 20*b* from within the airbag case. The airbag 22 pushes the cover 20*b*, which in turn pushes the webbing 40 covering the cover 20*b* and the skin member 16*d* of the arm rest. If the force the skin member receives is larger than a prescribed value, the sewed portion (rupture portion) 44 is ripped open-between the ends 40*a* of the webbing covering the airbag case 20 (more precisely, cover 20*b*) and the ends 16*d*1 of the skin member.

As the sewed portion 44 is ripped, separating the webbing 40 from the skin member 16*d* of the arm rest (as only the skin member of the arm rest is broken if the webbing is not used), an opening K is made in the passenger side (i.e., left side) of the arm rest. Then, the airbag 22 bulges and is deployed at the passenger side of the seat 10L. The airbag 22 eventually pushes the cover 20*b*, rotating the cover upward around the rotation axle 20*a*1 of the airbag case.

When the sewed portion 44 of the webbing and the skin member 16*d* of the arm rest (only the sewed portion of the skin member if the webbing is not used) are ripped open, the ribs 30 are released from the restriction of the webbing and skin member. The ribs 30 are rotated by 90° around the support axles 30*c*, by virtue of the bias of the bias members 30*a*, and the control portions 30*b*1 of the rib abut on the passenger-side surface 20*b*1 of the cover.

The cover 20*b* rotates upward around the rotation axle 20*a*1 of the airbag case at the same time the ribs 30 rotate around the support axles 30*c*, as the airbag 22 is inflated and deployed from the opening K toward the left-side seat 10L. That is, when the cover 20*b* is pushed by the airbag 22 and rotated upward, the ribs 30 rotate through 90° around the support axles 30*c*, assuming an orientation substantially perpendicular to the cover as shown in FIG. 2C. At the same time, the ribs 30 abut on the upper surface 20*a*2 of the main body 20*a* (i.e., upper surface of the airbag case), assuming a substantially upright orientation on the upper surface of the main body.

As seen from FIG. 2C and FIG. 3B, the ribs 30 abut on the upper surface 20*a*2 of the main body. Therefore, the ribs 30 support the back of the cover 20*b* rotated upward by 180° and assuming the substantially upright orientation. The ribs 30 standing upright with respect to the surface 20*b*1 of the cover are located on the airbag case (more precisely, on the upper surface 20*a*2 of the main body) in the space 16*c*1', supporting the cover 20*b* from back in the substantially upright orientation.

As shown in FIG. 3B, the airbag 22 is inflated and deployed along the cover 20*b* in the upright orientation. In other words, the airbag 22 is deployed toward the passenger side of the arm rest 16, while pushing the front side 20*b*2 of the cover. The cover 20*b* is held in the substantially upright orientation, at the front and back, by the ribs 30 standing in the upright orientation and the airbag 22 inflated and deployed.

If an impact F is applied to the right side, the vehicle 1 is pushed to the left. The passenger on the far-side seat 10L tends to remain at the seated position, but undergoes an inertial motion to the collision side (right side) of the vehicle. However, the airbag receives the inertial force FL acting on the passenger toward the collision side (right side) of the vehicle, because the airbag 22 is inflated and deployed between the passenger and the arm rest 16 of the far-side seat (see FIG. 3B).

The inertial force FL acting on the passenger and received by the airbag 22, is transmitted via the airbag to the cover 20b. However, the cover, which is supported from back by the ribs 30 and is not further rotated, remains in the substantially upright orientation, despite the bending moment acting on it at the time of collision. The cover therefore exerts a reaction force on the airbag 22, against the inertial force FL. That is, the cover 20b supported by the ribs 30 functions as reaction means. Hence, the ribs alone make the cover withstand the bending moment applied at the time of collision, rendering it unnecessary to thicken the cover or use high rigidity material for the cover. Thus, the cover 20b resists the bending moment and supports the airbag 22 by exerting a sufficient reaction force on the back of the airbag, protecting the passenger on the far-side seat 10L at the time of collision. Thus, the airbag can well perform its function of protecting the passenger.

The ribs 30 keep lying flat on the passenger-side surface 20b1 of the cover as long as the cover closes the airbag case 20. The torsion spring is used as the bias member 30a and is wound around the support axles 30c of the rib. Therefore, when the cover is rotated upward, opening the airbag case, the ribs immediately rotate, assuming a substantially upright orientation, by virtue of the bias of the torsion springs. The ribs 30 assumes the upright orientation before the cover 20b is rotated upward by 180°, and reliably support the back of the cover so rotated, in the substantially upright orientation. Hence, the cover 20b can sufficiently withstand the bending moment applied to it when the vehicle collides at one side.

Since the ribs 30 are biased, each by a torsion spring 30a combined with the rib, the passenger protection device can be more simple and smaller than otherwise.

The support members are ribs 30 that can be made by processing plates such as steel plates, and can therefore be thin even if they lie flat. Therefore, the length (width) of the arm rest 16, measured in the left-right direction, increases but a little as compared with the case where no ribs are used.

As specified above, the first support strip 30b of each rib 30 has control portions 30b1. The control portions 30b1 abut on the passenger-side surface 20b1 of the cover when the rib is rotated by virtue of the bias of the torsion spring 30a. The control portions 30b1 therefore hold the rib 30 in an upright orientation with respect to the surface 20b1 of the cover, reliably supporting the cover 20b in the upright orientation, from back. Therefore, the cover 20b can more withstand the bending moment applied than otherwise when the vehicle collies at one side.

As described above, if the vehicle collides at the right side, the airbag 22 contained in the arm rest 16 of the left-side seat (i.e., far-side seat) is inflated and deployed outside through the opening K made in the passenger side (i.e., left side) of the arm rest. Pushed by the airbag, the cover 20b rotates upward and the ribs 30 stand in the upright orientation above the airbag case 20, supporting the cover from back in a substantially upright orientation. The airbag 22 is further inflated and deployed, protecting the passenger on the far-side seat.

Conversely, the vehicle may collide at the left side. In this case, the airbag contained in the arm rest of the right-side seat (i.e., far-side seat) is inflated and deployed, protecting the passenger on the right-side seat. Since the arm rests of the left-side and right-side seats contain an airbag each, the passenger on the far-side seat is protected by the airbag whether the vehicle collides at the left side or the right side.

Figures 1, 4A:
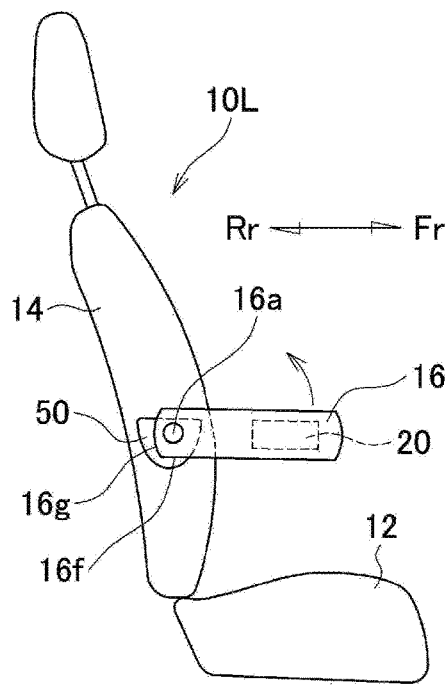
FIG. 4A-1 is a side view of the vehicle seat with the arm rest rotated forward.
Figures 2, 4A:
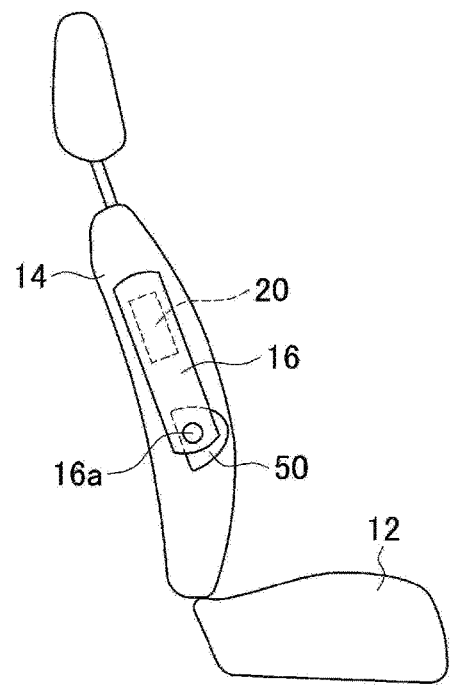
Figures 1, 4B:
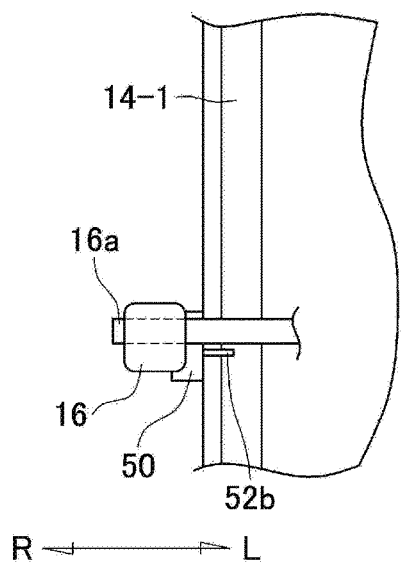
Figures 2, 4B:
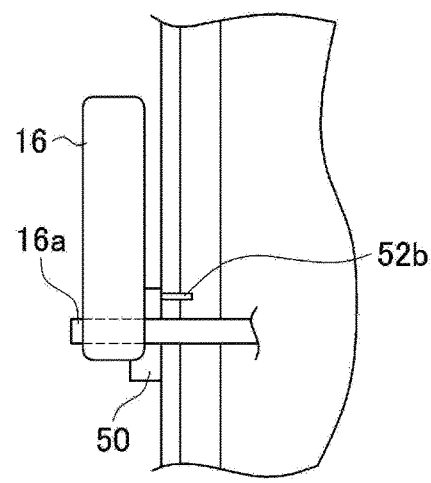

FIG. 4A-1 is a side view of the vehicle seat with the arm rest rotated forward; FIG. 4A-2 is a side view of the vehicle seat with the arm rest rotated to the stored position; FIG. 4B-1 is a partly sectional, magnified front view of a part of the seatback with the arm rest rotated forward; FIG. 4B-2 is a partly sectional, magnified front view of a part of the seatback, with the arm rest rotated to the stored position and FIG. 5 is a partly sectional, perspective view showing the seatback frame, support member and arm rest as seen from back.

If the vehicle collides at the right side, an inertial force FL is transmitted from the passenger on the right-side seat to the arm rest 16 through the airbag 22. A bending moment therefore acts on the arm rest, possibly twisting the arm rest toward the collision side (i.e., right side). In order to prevent the twisting of the arm rest, a holding member 50 is provide around the axle 16a of the arm rest 16, and between the arm rest 16 and the seatback 14.

Both the right-side seat 10R and the left-side seat 10L have a holding member 50. Only the holding member of the left-side seat will be described, assuming that the vehicle receives a collision impact F at the right side. The right-side seat 10R and the left-side seat 10L are identical in structure, though they are symmetrical as viewed in the left-right direction.

The holding member 50 is made by processing, for example, a steel plate. As shown in FIG. 5, the holding member is shaped like a fan, gradually spreading from the front toward the back. The holding member has a flat portion 52 and a projecting portion 54. The projecting portion 54 is provided on that surface (right-side surface) of the holding member 50, which faces one side surface (left-side surface 16e) of the arm rest.

The rear portion of the left-side surface 16e of the arm rest contacts the flat portion 52 of the holding member 50. The holding member is secured to the arm rest. The projecting portion 54 protrudes from the rear-upper portion of the holding member 50 toward the front-lower portion thereof. As seen from FIG. 4A-1 and FIG. 5, a straight upper edge 54a and a curved front edge 54b of the projecting portion are shaped to hold, in part, the flat lower surface 16f and curved rear surface 16g of the arm rest, respectively.

Namely, the arm rest 16 has its rear surface 16g held by the projecting portion 54 of the holding member. In other words, the holding member 50 holds the arm rest 16 at the back, and functions as member for receiving the arm rest.

Thus, the straight upper edge 54a of the projecting portion holds the flat lower surface 16f of the rear portion of the arm rest, and the curved front edge 54b of the projecting portion holds the curved rear surface 16g of the arm rest. In this configuration, the arm rest 16 can reliably rotate together with the holding member 50.

An axle hole 52a is made in the flat portion 52 of the holding member. A control pin 52b is secured to the flat part 52 in the vicinity of the axle hole. The axle hole 52a is the hole through which the axle 16a, around which the arm rest 16 may rotate, extends. The seatback frame 14-1 and the arm rest 16, which clamp the holding member 50, also have an axle holes 14-1a and an axle hole 16a', respectively, through which the axle 16a extends. The control pin 52b is arranged on the lower-front side of the axle hole 52a. As seen from FIGS. 4B-1 and 4B-2, the control pin extends to the left, toward the side of the seatback (more precisely, toward the seatback frame 14-1).

The seatback frame 14-1 has a guiding slit 14-1b in addition to the axle hole 14-1a through which the axle 16a extends. The control pin 52b extends through the guiding slit 14-1b. The guiding slit is arcing around the axle hole 14-1a and positioned in the vicinity of the axle hole.

The holding member 50 is secured to the arm rest 16. The holding member 50 therefore rotates together with the arm rest when the arm rest is rotated in the direction indicated by the arrow in FIG. 4A-1, from its substantially horizontal position, where it is rotated forward, to its substantially upright orientation where it is stored (see FIG. 4A-2). Hence, if the arm rest 16 is rotated, the control pin 52b moves upwards, guided by the guiding slit 14-1b. When the control pin 52b slides from the lower end of the guiding slit 14-1b to the upper end thereof, the arm rest 16 is rotated upward and set in the stored position.

As the arm rest 16 is rotated from its horizontal position to its stored position, the control pin 52b slides in the guiding slit 14-1b, from the lower end of the guiding slit (i.e., horizontal position) to the upper end of the guiding slit (i.e., stored position). The guiding slit 14-1b and the control pin 52b therefore constitute a control means for controlling the rotation of the arm rest.

If an impact F is applied to the right side of the vehicle, the airbag 22 is inflated and deployed, receiving from the right side the inertial force FL acting on the passenger seated on the far-side seat 10L. Then, the cover 20b rotates upward by 180°, taking a substantially upright orientation (i.e., standing position), and transmits the inertial force FL to the arm rest 16. As a result, a bending moment acts on the arm rest 16 to twist the arm rest around the axle 16a toward the collision side (i.e., right side) of the vehicle.

However, the holding member 50 is mounted around the axle 16a and the arm rest 16 contact each other at a large surface. Therefore, the holding member and the arm rest can contact each other at a large area. In addition, the holding member 50 is arranged between the arm rest 16 and the seatback frame 14-1, and the arm rest is connected to the seatback by the flat portion 52 of the holding member and by the straight upper edge 54a and curved front edge 54b of the projecting portion. The holding member 50 therefore provides a large contact surface between the arm rest and the seatback frame. In other words, the contact surface between the arm rest and the seatback frame actually increases by the area of the flat portion 52 of the holding member, the straight upper edge 54a and curved front edge 54b of the projecting part.

The holding member 50 therefore receives, in a large area, the bending moment applied to the arm rest 16, and prevents the twisting of the arm rest.

Thus, the arm rest 16 withstands the bending moment, and never be twisted. The airbag 22 inflated and deployed can therefore well protect the passenger on the far-side seat.

The holding member 50 is not limited to a fan-shaped one. It may be of any other configuration, only if it provides a large contact surface between it and the seatback frame 14-1, to prevent the arm rest 16 from being twisted to the collision side.

In the embodiment described above, the holding member 50 is not integral with the arm rest 16 and is secured to the arm rest at a large contact surface. Instead, the holding member may be formed integral with the arm rest frame 16b. If the arm rest frame 16b and the holding member 50 are made of resin and formed integral with each other, a larger contact area can be provided between the arm rest 16 and the seatback flame 14-1 via the holding member. In this case, the holing member well receives the bending moment applied to the arm rest, thanks to the large contact area, preventing the arm rest from being twisted.

Moreover, of the guiding slit 14-1b and the control pin 52b which constitute the control means 60, one may be provided at the seatback frame 14-1, and the other may be provided at the holding member 50 with the arm rest 16. Contrary to the configuration shown in FIG. 5, the control pin 52b may be secured to the seatback frame 14-1 and the guiding slit 14-1b may be cut in the holding member 50.

Further, the control means 60 is not limited to the combination of the guiding slit 14-1b and control pin 52b. It only need be configured to control the rotation of the arm rest 16 with respect to the seatback frame 14-1.

Figure 6A:
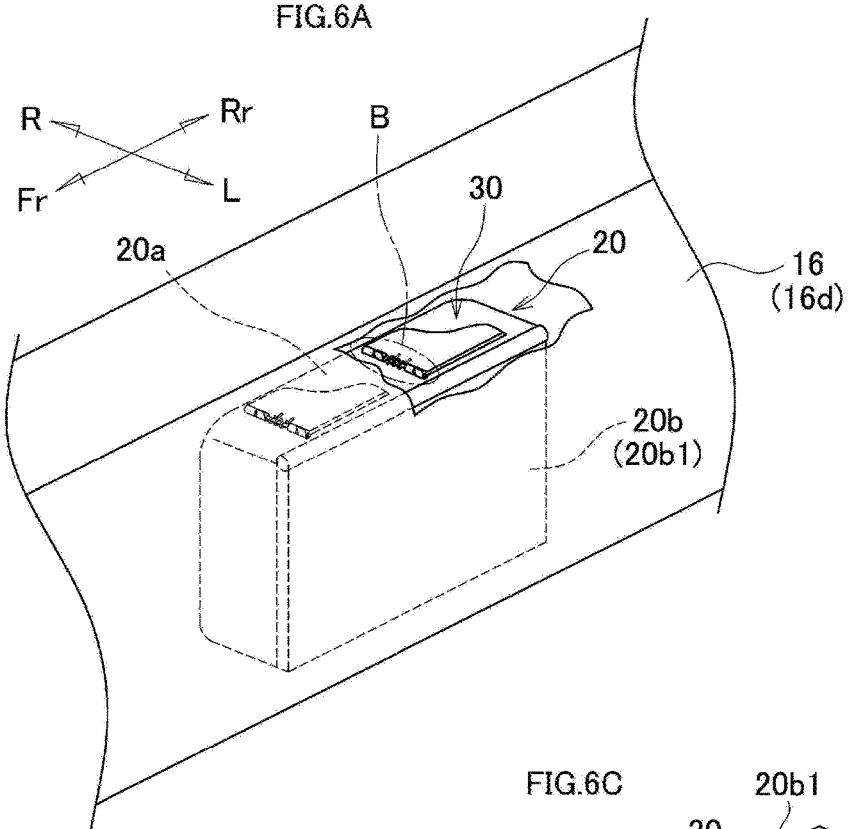
FIG. 6A is a partly sectional, perspective view of an arm rest containing a passenger protection device according to a modification of the embodiment (Embodiment 1) of this invention.
Figure 6C:
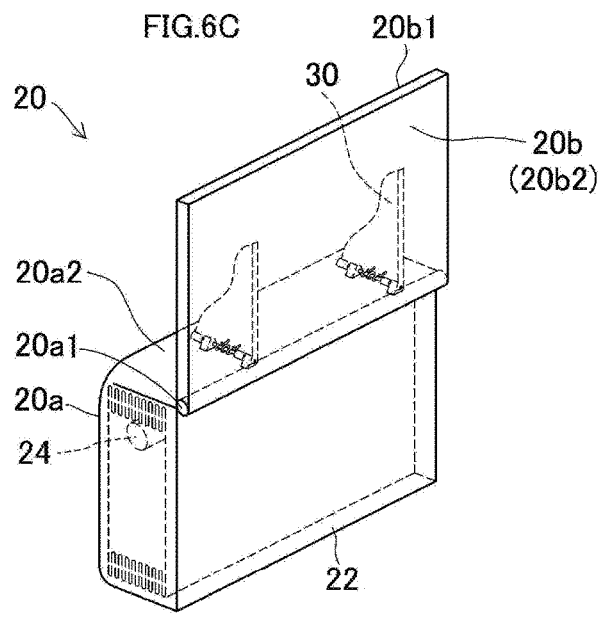
FIG. 6C is a perspective view of an airbag case, with a cover rotated at one side of the passenger protection device.
Figure 6B:
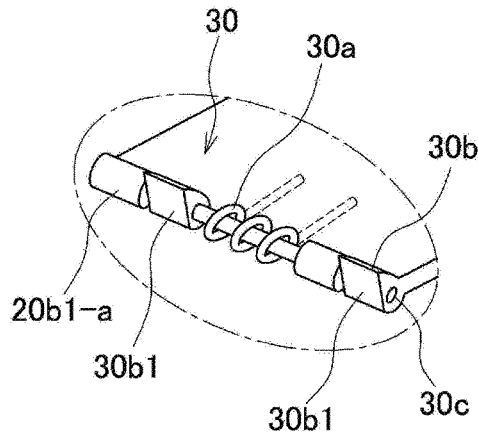
FIG. 6B is a magnified view of part B of FIG. 6A.

FIG. 6A is a partly sectional, perspective view of an arm rest containing a passenger protection device according to a modification of the embodiment (Embodiment 1) of this invention; FIG. 6B is a magnified view of part B of FIG. 6A and FIG. 6C is a perspective view of an airbag case, with a cover rotated at one side of the passenger protection device, FIG. 6D-A is a sectional view of the arm rest in normal condition, as FIG. 3A and FIG. 6D-B is a partly sectional view of the arm rest at the time of a collision, as FIG. 3B.

In Embodiment 1, the support members (ribs) 30 are provided on the passenger side, i.e., surface 20b1 of the cover. In this modification, the support members 30 are provided on the upper surface 20a2 of the airbag case, as will be described below. The components identical to those of Embodiment 1 are designated by the same reference numbers, and the components different from those of Embodiment 1 will be described in the main.

As seen from FIG. 6A, the airbag case 20 is shaped like a box. The passenger-side wall of the airbag case is a cover 20b that can rotate upward around its upper end. Two support members 30 for supporting the cover are arranged in a lying position on the upper surface 20a2 of the airbag case. If the vehicle collides at one side, the airbag is inflated, bulging out through the opening made in the passenger side of the arm rest, and is then deployed, pushing the cover 20b and rotating the same upward. As the cover 20b is so rotated, the support members 30 stand upright on the upper surface 20a2 of the airbag case, supporting the cover from back, in a substantially upright orientation.

The support members 30 are similar in structure to those used in the embodiment (Embodiment 1) described above, but are provided at different positions. That is, the support members 30 are ribs provided on the upper surface 20a2 of the airbag case, have a bias member 30a each, and can rotate around a support axle 30c extending in the left-right direction of the vehicle.

The ribs (support members) 30 are pushed to the skin member (i.e., trim cover) 16d of the arm rest, which covers the airbag case 20, either via the pad 16c or not via the pad. The ribs 30 are then held lying flat on the upper surface 20a2 of the airbag case. If the vehicle collides at one side, the airbag 22 is inflated, pushing the cover 20b, ripping that portion (sewed portion) of the skin member of the arm rest, which lies on the passenger side. As the portion (sewed portion) of the skin member is ripped, an opening is made on the passenger side of the arm rest. The ribs 30 are no longer restricted by the skin member (trim cover), and stand up as the cover 20b is rotated, and support the cover from back in a substantially upright orientation.

As in Embodiment 1, at the time of collision the ribs 30 stand up on the upper surface 20a2 of the airbag case and support, from back, the cover 20b rotated upward to a substantially upright orientation. The cover 20b so supported by the ribs 30 remains in the substantially upright orientation against the bending moment acting on it at the time of collision. The cover 20b therefore functions as reaction means, and the airbag (i.e., passenger protection device) can fully perform its function.

The ribs 30 are held on the upper surface 20a2 of the airbag case, each by first support strips 30b provided on the rib and by a support axle 30c. The support axle is supported by the second support strips 20b1-a provided on the upper surface of the airbag case (see FIG. 6B). Each bias member 30a is, for example, a torsion spring wound around the support axle 30c. As the cover 20b is rotated upward, the ribs 30 stand in a substantially upright orientation on the upper surface 20a2 of the airbag case by virtue of the bias of the torsion spring, and support the cover 20b from back in a substantially upright orientation.

The first support strip 30b of each rib has a control portion 30b1. The control portion 30b1 has a surface that is substantially perpendicular to the upper surface 20a2 of the airbag case while the support members 30 are lying flat on the upper surface of the airbag case.

As shown in FIGS. 6A and 6C, two ribs 30 are arranged side by side in the front-rear direction of the vehicle. Instead, one rib may be arranged, or three or more ribs may be arranged side by side, on the passenger-side surface 20b1 of the cover.

As in Embodiment 1, the airbag case 20 is covered with webbing 40, and the skin member (trim cover) of the arm rest 16 covers the webbing. The ends of the webbing 40 and the ends of the skin member of the arm rest 16 overlapped, bent inwards to make bent parts, and sewed together, and the bent parts are sewed together at a lower-inner corner of the arm rest 16, forming sewed portion 44. If the airbag 22 is inflated in the airbag case 20 at the time of collision, it pushes the cover 20b, ripping the sewed portion 44, making an opening.

Figure 7A:
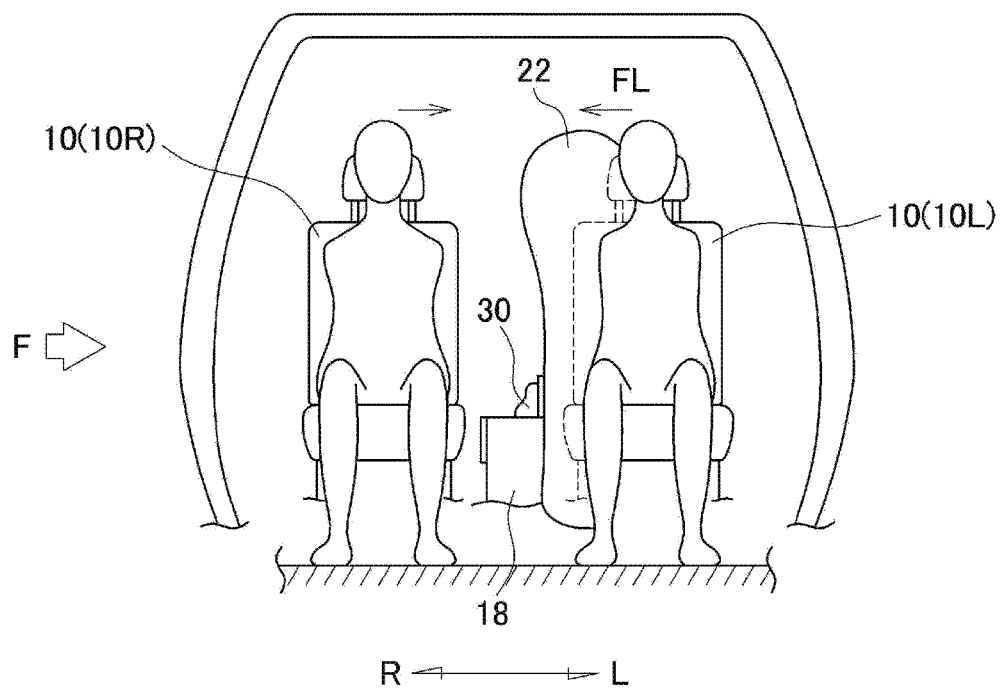
FIG. 7A a schematic sectional view of a vehicle in which the console box contains a passenger protection device according to another embodiment (Embodiment 2) of this invention.
Figure 7B:
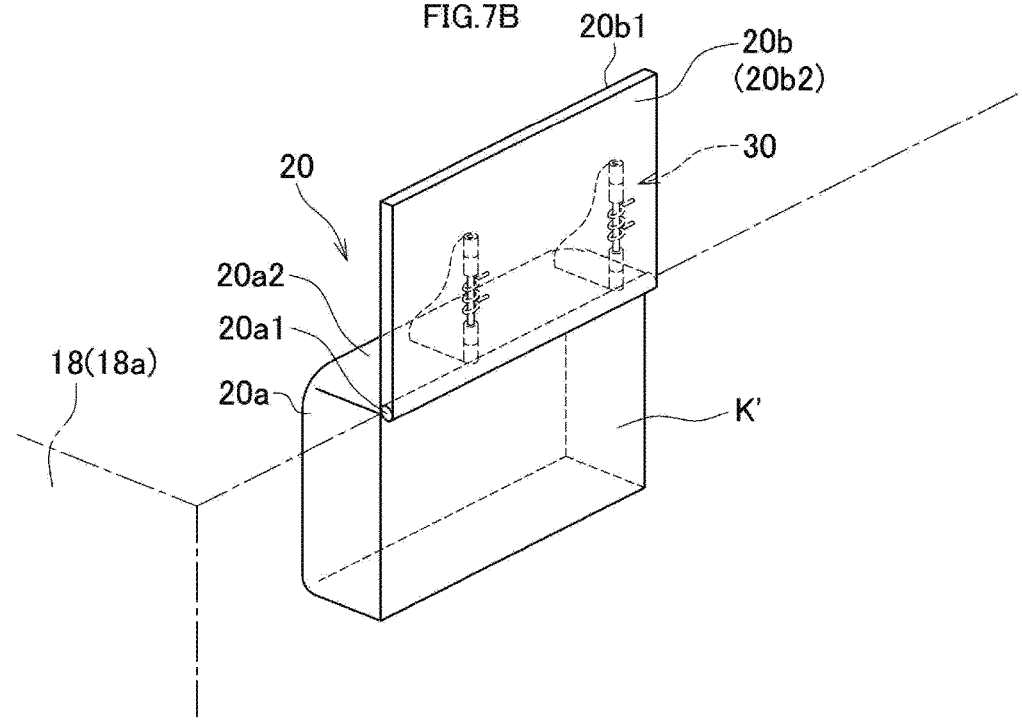
FIG. 7B is a perspective view of an airbag case, with a cover rotated at one side of the passenger protection device, not showing an inflator and airbag.

FIG. 7A a schematic sectional view of a vehicle in which the console box contains a passenger protection device according to another embodiment (Embodiment 2) of this invention, FIG. 7B is a perspective view of an airbag case, with a cover rotated at one side of the passenger protection device, not showing an inflator and airbag, FIG. 8A is a sectional view of the console box in normal condition, as FIG. 3A and FIG. 8B is a partly sectional view of the console box at the time of a collision, as FIG. 3B.

In Embodiment 1, the airbag is contained in the arm rest. In Embodiment 2, the airbag is contained in a console box provided between two vehicle seats arranged side by side in the width direction (left-right direction) of the vehicle. In this respect, Embodiment 2 differs from Embodiment 1. The components identical to those of Embodiment 1 are designated by the same reference numbers, and the components different from those of Embodiment 1 will be described in the main.

Two vehicle seats 10 are arranged on the floor 2 of a vehicle 1, side by side in the widthwise direction (left-right direction) of the vehicle. Between the vehicle seats, a console box 18 is provided.

Two units, each composed of the airbag case 20 and the airbag 22, are arranged on the left and right sides of the console box 18, respectively, and are spaced apart in the left-right direction of the vehicle. The unit arrange on the left side (far side) of the console box will be described. As seen from FIG. 7B, the rotation axle 20a1 of the cover 20b of the airbag case is arranged substantially at the same height as the left-upper edge of the console box 18. The cover 20b is arranged, along the passenger-side surface 20b1 of the airbag case 20, namely along the far-side surface (left-side surface) of the console box. The airbag case is arranged, with its upper surface 20a2 aligned with the upper surface of the console box.

As in Embodiment 1, the airbag case 20 is covered with webbing 40, and the skin member (trim cover) 18a of the console box covers the airbag case 20 covered with the webbing 40. The webbing is sewed, at ends 40a, to the ends of the skin member 18a of the console box, forming sewed portion (rupture portion) 44.

As in Embodiment 1, support members 30 (i.e., ribs) are provided on the cover 20b. The ribs are pushed, either via a pad or not via a pad, to the skin member 18a of the console box. The skin member 18a covers the airbag case 20. The ribs 30 shown in FIG. 7B to FIG. 8B are pushed to the webbing 40 and the skin member 18a of the console box, not via the pad, and held lying flat on the passenger-side surface 20b1 of the cover despite the bias of bias member 30a such as a torsion spring.

In Embodiment 2, the ribs 30 are secured to the passenger-side surface 20b1 of the cover, each by first support strips 30b provided on the rib and by a support axle 30c. The support axle is supported by second support strips 20b1-a provided on the passenger-side surface of the cover. The bias member 30a is a torsion spring wound around the support axle 30c and located between the first support strips 30b of the rib and the second support strips 20b1-a of the cover. If the vehicle collides at one side, the ribs 30 are rotated upward by virtue of the bias of the torsion springs as the cover 20b rotates, take a substantially upright orientation on the airbag case 20, and support the cover from back.

The first support strip 30b of each rib has a control portion 30b1. The control portion has a surface that is substantially perpendicular to the passenger-side surface 20b1 of the cover while the ribs 30 are lying flat on the passenger-side surface of the cover.

Two ribs 30 are arranged side by side. Instead, one rib may be arranged, or three or more ribs may be arranged side by side, on the passenger-side surface 20b1 of the cover.

As in Embodiment 1, the airbag case 20 is covered with webbing 40. The webbing 40 is covered with skin member of the console box 18. The ends of the webbing 40 and the ends of the skin member of the console box 18 overlapped, bent inwards to make bent parts, and sewed together, and the bent parts are sewed together at a lower-inner corner of the console box 18, forming sewed portion 44. If the vehicle collies at one side, the airbag 22 is inflated in the airbag case 20, pushing the cover and ripping the rupture portion 44 and forming an opening K'.

As shown in FIG. 7A, the vehicle 1 may receive, at the right side, the impact F acting in the direction of the arrow. In this case, the sewed portion (rupture portion) 44 of the far-side seat 10L are ripped open. That is, the webbing 40 and the skin member 18a of the console box are no longer sewed together. The airbag 22 therefore pushes up the cover 20b. So pushed, the cover 20b rotates upward around the rotation axle 20a1 of the cover 20b in the opening K' made in the passenger side of the console box.

Since the webbing 40 and the skin member 18a of the console box are no longer sewed together, the ribs 30 secured to the passenger-side surface 20b1 of the cover ceases to be pushed by the webbing and the skin member. The ribs 30 are therefore rotated by 90° around the support axle 30c by virtue of the bias of the bias member 30a. Then, the control portions 30b1 of the ribs abut on the passenger-side surface 20b1 of the cover.

The ribs 30 are rotated around the support axle 30c, each taking a standing position, at the same time the cover 20b is rotated upward around the rotation axle 20a1 of the airbag case. That is, as the cover 20b is rotated upward, the ribs 30 are rotated and stand, substantially perpendicular to the passenger-side surface 20b1 of the cover.

The cover 20b rotated by 180° and now standing in a substantially upright orientation is supported from back, by the ribs 30. That is, the ribs 30 now standing on the upper surface 20a2 of the airbag case (more precisely, on the upper surface of the console box 18), support the cover 20b from back.

In Embodiment 2, the airbag case 20 is provided in the console box 18. The airbag 22 therefore receives the inertial force FL from the passenger (see FIG. 7A) if a collision impact F acts on the right side of the vehicle in the same way as in Embodiment 1. Due to the inertial force FL applied from the passenger to the airbag 22, a bending moment acts on the cover 20b. The cover 20b, which is supported by ribs 30 from back, can apply a reaction force to the ribs against the inertial force applied to the cover. Thus, the cover functions as reaction means. Arranged on the cover 20b, the ribs 30 alone enable the cover to withstand the bending moment. Withstanding the bending moment, the cover 20b supports the airbag 22 from back with a sufficient reaction force. Hence, the airbag well protects the passenger seated on the far-side seat. Thus, the passenger protection device according to Embodiment 2 can well protect the passenger seated on the far-side seat.

In Embodiment 2, two units, each composed of an airbag case 20 and an airbag 22, are provided in the console box 18 and spaced apart in the left-right direction of the vehicle. The passenger protection device can therefore protect the passenger on the far-side seat whether the vehicle collides at the left side or the right side.

As describe above, at the time of collision the support members (ribs) stand and support the cover of the airbag case from back in a substantially upright orientation, applying a reaction force to the cover against the inertial force applied to the passenger on the far-side seat. The cover so supported by the support members functions as reaction means. The support members provided on the cover enable the cover to withstand a large moment. The cover need not be made thick or made of material having high rigidity. The passenger protection device can fully perform its protective function.

The embodiments have been described to explain this invention, and are not intended to limit the scope of the invention. Accordingly, various changes and modifications may be made within the spirit or scope of this invention, and are of course included in this invention.

In the embodiments described above, two airbag cases are provided, respectively in the arm rests arranged in the widthwise direction (i.e., left-right direction) of a vehicle, or are provided in the console box arranged between two vehicle seats arranged in the widthwise direction of the vehicle. The positions of the airbag cases are not limited to these, nevertheless.

The airbag cases may be provided in the arm rests of a bench-type seat comprising a plurality of seats which are arranged and connected in the widthwise direction of the vehicle and on which two or more passengers may be seated. In the bench-type seat, each seat has a recess in the front of its seatback. In the recess, an arm rest is provided and can be rotated forward in front of the seatback. The arm rest of each seat stores an airbag case in one side.

Alternatively, the airbag cases may be provided on the ceiling portion of the vehicle. In this case, when the vehicle collides at one side, the airbags are inflated and deployed downward from the airbag cases to protect the passengers on the vehicle seats.

INDUSTRIAL APPLICABILITY

This invention is applied generally to vehicle seats for use in automobiles, each having an airbag case in the arm rest or in the console box. It can be applied also to seats for use in trains, aircraft, etc., each having an airbag case.

REFERENCE MARKS IN THE DRAWING 1 vehicle
10 vehicle seats
12 seat cushion
14 seatback
14-1 seatback flame
14-1b guiding slit
16 arm rest
16a axle of arm rest
16b arm rest flame
16c pad
16d skin member (trim cover)
18 console box
20 airbag case
20a main body of console box
20a1 rotation axle of airbag case
20b cover
22 airbag
24 inflator
30 support members (rib(s))
30a bias member
30c support axle
40 webbing
44 sewed portion (rupture portion)
50 holding member
52 flat portion
52a axle hole
52b control pin
54 projecting portion
60 control means

What is claimed is:

1. A passenger protection device comprising:
an airbag case to be provided in an arm rest of a vehicle seat, and an airbag with an inflator, folded and stored in the airbag case and configured to be inflated if the vehicle having the device collides at one side and then be deployed outside the airbag case through an opening made in the arm rest, thereby to protect the passenger seated on the vehicle seat;
wherein the airbag case is box-shaped and has a passenger-side wall that is a cover that can rotate upward around its upper end;
the device comprises support members that lie flat on a passenger-side surface of the cover and can assume an upright orientation; and
if the vehicle collides at one side, the airbag is inflated and deployed outside the airbag case through the opening made in a passenger-side of the arm rest and pushes the cover, thereby rotating the cover upward, the support members stand on the airbag case, supporting the cover rotated upward from back in an upright orientation.

2. The passenger protection device according to claim 1, wherein the support members are ribs provided on the passenger-side surface of the cover, each having a bias member and able to rotate around an axle extending in an up-down direction;

the support members are pushed, by a skin member of the arm rest, which covers the airbag case, and be restricted to lie flat on the passenger-side surface of the cover; and the support members are released from the restriction of the skim member and stand upright by virtue of the bias of the bias member as the cover rotates upward, supporting the cover from back in the upright orientation, when the airbag is inflated, pushing the cover and tearing the skin member on the passenger side of the arm rest, thereby making the opening in the passenger side of the arm rest.

3. The passenger protection device according to claim 2, wherein each support member is secured to the passenger-side surface of the cover by first support strips provided on each rib and by a support axle which is supported by second support strips provided on the passenger-side surface of the cover;

the bias member is a torsion spring wound around the support axle; and as the cover rotates upward, each support member stands on the airbag case in an upright orientation, by virtue of the bias of the torsion spring, to support the cover from back.

4. The passenger protection device according to claim 3, wherein each first support strip has a control portion, and the control portion is a surface perpendicular to the passenger-side surface of the cover while the support members remain lying flat on the passenger-side surface of the cover.

5. The passenger protection device according to claim 4, wherein at least two support members are arranged side by side, to support the cover from back, evenly at the left and right parts of the cover.

6. The passenger protection device according to claim 3, wherein at least two support members are arranged side by side, to support the cover from back, evenly at the left and right parts of the cover.

7. The passenger protection device according to claim 1, wherein a webbing covers the airbag case, the skin member of the arm rest covers the webbing;

the ends of the webbing and the ends of the skin member of the arm rest overlapped, bent inwards to make bent parts, and sewed together, and the bent parts are sewed together at a lower-inner corner of the arm rest, forming sewed portion, when the airbag is inflated in the airbag case at the time of collision, the airbag pushes the cover, ripping the sewed portion, thereby making the opening in the passenger-side of the arm rest.

8. The passenger protection device according to claim 7, wherein the arm rest can be rotated around an axle with respect to a seatback of the vehicle seat, from a horizontal position to a vertical position;

a holding member is provided around the axis of the arm rest and between the arm rest and the seatback, and hold the arm rest;

the holding member receive a bending moment acting on the arm rest, preventing the arm rest from being twisted.

9. The passenger protection device according to claim 8, wherein the holding member has a flat portion and a projecting portion;

the projecting portion is provided on that surface of the holding member, which faces the arm rest;

the flat portion has an axle hole through which the axle of the arm rest extends, and the arm rest contacts the flat portion, at a side face of a rear part and restricted by the side face of the rear part, and held by the projecting portion at the rear part, and is able to rotates together with the holding member.

10. The passenger protection device according to claim 9, wherein a control means is provided between the holding member and the arm rest, to control the rotation of the arm rest between the horizontal position and the vertical position, and the control means includes an guiding slit and a control pin, the guiding slit made in one of a seatback frame and the support member and arching around the axle hole through which the axis of the arm rest extends, and the control pin provided on the other of the seatback frame and the support member, passing through the guiding slit and sliding in the guiding slit.

11. A passenger protection device comprising:

an airbag case to be provided in an arm rest of a vehicle seat, and an airbag with an inflator, folded and stored in the airbag case and configured to be inflated if the vehicle having the device collides at one side and then be deployed outside the airbag case through an opening made in the arm rest, thereby to protect the passenger seated on the vehicle seat;

wherein the airbag case is shaped like a box and has a passenger-side wall that is a cover that can rotate upward around its upper end;

the device comprises support members that lie flat on an upper surface of the airbag case and can assume an upright orientation; and if the vehicle collides at one side, the airbag is inflated and deployed outside the airbag case through the opening made in a passenger-side of the arm rest and pushes the cover, thereby rotating the cover upward, the support members stand on the airbag case, supporting the cover rotated upward from back in an upright orientation.

12. The passenger protection device according to claim 11, wherein the support members are ribs provided on the upper surface of the airbag case, each having a bias member and able to rotate around an axle extending in an left-right direction;

the support members are pushed, via a pad or not via a pad, by a skin member of the arm rest, which covers the airbag case, and be restricted to lie flat on the upper surface of the airbag case; and the support members are released from the restriction of the skim member and stand upright by virtue of the bias of the bias member as the cover rotates upward, supporting the cover from back in the upright orientation, when the airbag is inflated, pushing the cover and tearing the skin member on the passenger side of the arm rest, thereby making the opening in the passenger side of the arm rest.

13. The passenger protection device according to claim 12, wherein each support member is secured to the upper surface of the airbag case by first support strips provided on each rib and by a support axle which is supported by second support strips provided on the upper surface of the airbag case;

the bias member is a torsion spring wound around the support axle; and as the cover rotates upward, each support member stands on the airbag case in an upright orientation, by virtue of the bias of the torsion spring, to support the cover from back.

14. The passenger protection device according to claim 13, wherein each first support strip has a control portion, and the control portion is a surface perpendicular to the upper surface of the airbag case while the support members remain lying flat on the upper surface of the airbag case.

15. The passenger protection device according to claim 13, wherein at least two support members are arranged side by side, to support the cover from back, evenly at the left and right parts of the cover.

16. A passenger protection device comprising:

two airbag cases to be provided in a console box arranged between the left and right vehicle seats, and two airbags, each having an inflator, folded and stored in the airbag case and configured to be inflated if the vehicle having the device collides at one side and then be deployed outside the airbag cases through an opening made in the console box, thereby to protect the passenger seated on the vehicle seat;

wherein two units each composed of an airbag case and an airbag, are spaced apart in the console box, in a left-right direction of the vehicle;

each airbag case is box-shaped and has a passenger-side wall that is a cover that can rotate upward around its upper end;

the device comprises support members that lie flat on the passenger-side surface of the cover and can assume an upright orientation; and if the vehicle collides at one side, the airbag is inflated at far side opposing a collision side and deployed outside the airbag case through the opening made in a passenger side of the console box and pushes the cover, thereby rotating the cover upward, and the support members stand on the airbag case, supporting the covers rotated upward from back in an upright orientation.

17. The passenger protection device according to claim 16, wherein the support members are ribs provided on the passenger-side surface of the cover, each having a bias member and able to rotate around an axle extending in an up-down direction;

the support members are pushed, by a skin member of the console box, which covers the airbag case, and be restricted to lie flat on the passenger-side surface of the cover; and the support members are released from the restriction of the skim member and stand upright by virtue of the bias of the bias member as the cover rotates upward, supporting the cover from back in the upright orientation, when the airbag is inflated, pushing the cover and tearing the skin member on the passenger side of the console box, thereby making the opening in the passenger side of the console box.

18. The passenger protection device according to claim 17, wherein each support member is secured to the passenger-side surface of the cover by first support strips provided on each rib and by a support axle which is supported by second support strips provided on the passenger-side surface of the cover;

the bias member is a torsion spring wound around the support axle; and as the cover rotates upward, each support member stands on the airbag case in an upright orientation, by virtue of the bias of the torsion spring, to support the cover from back.

19. The passenger protection device according to claim 18, wherein each first support strip has a control portion, and the control portion is a surface perpendicular to the passenger-side surface of the cover while the support members remain lying flat on the passenger-side surface of the cover.

20. The passenger protection device according to claim 18, wherein at least two support members are arranged side by side, to support the cover from back, evenly at the left and right parts of the cover.

* * * * *